United States Patent [19]

Kawaguri et al.

[11] Patent Number: 5,299,428
[45] Date of Patent: Apr. 5, 1994

[54] ENVIRONMENTAL CONTROL SYSTEM AND METHOD

[75] Inventors: Mariko Kawaguri, Moriguchi; Nobuyuki Yoshiike, Ikoma; Koji Arita; Susumu Kobayashi, both of Osaka; Katsuya Morinaka, Hirakata, all of Japan

[73] Assignee: Matsushita Electric Industrial Co., Ltd., Kadoma, Japan

[21] Appl. No.: 39,832

[22] Filed: Mar. 30, 1993

[30] Foreign Application Priority Data

Apr. 2, 1992 [JP] Japan .................................. 4-080617

[51] Int. Cl.⁵ .............................................. F25D 23/12
[52] U.S. Cl. .................................. 62/176.6; 62/261; 236/91 C
[58] Field of Search ............................. 62/261, 176.6; 236/91 C, 1 R; 165/26; 454/907

[56] References Cited

U.S. PATENT DOCUMENTS

| 4,777,802 | 10/1988 | Feher | 62/261 X |
| 4,884,304 | 12/1989 | Elkins | 62/261 X |
| 5,170,935 | 12/1992 | Federspiel et al. | 236/91 C |

FOREIGN PATENT DOCUMENTS 3-267642  11/1991  Japan .................................. 236/1 R

*Primary Examiner*—William E. Wayner
*Attorney, Agent, or Firm*—Ratner & Prestia

[57] ABSTRACT

An environmental control system comprises room temperature measurement apparatus, a plurality of thermal sensors fixed on a mattress over a bed, a plurality of humidity sensors fixed on the mattress over the bed, an air conditioning unit for varying the room temperature, and a control circuit. The control circuit determines a thermal sensation of a sleeper from measured values by a plurality of thermal sensors, determines a perspiratory sensation of the sleeper from the measured values by a plurality of humidity sensors, and controls the air conditioning unit so as to let the temperature of the air in the vicinity of the bed be different from the room temperature by an amount prescribed by the combination of the room temperature value and the thermal and perspiratory sensation values, thus maintaining a comfortable condition in the bedroom and on the mattress.

12 Claims, 7 Drawing Sheets

| SUMMER | THERMAL SENSATION | | | | | | |
|---|---|---|---|---|---|---|---|
| | -3 | -2 | -1 | 0 | +1 | +2 | +3 |
| ROOM TEMPERATURE (°C) 22 | +4 | +3 | +2 | 0 | — | — | — |
| 23 | +3 | +3 | +2 | 0 | -1 | -1 | -1 |
| 24 | +3 | +2 | +2 | 0 | -1 | -1 | -1 |
| 25 | +2 | +2 | +1 | 0 | -1 | -1 | -2 |
| 26 | +2 | +1 | +1 | 0 | -1 | -1 | -2 |
| 27 | +2 | +1 | +1 | 0 | -1 | -2 | -2 |
| 28 | +1 | +1 | +1 | 0 | -2 | -2 | -3 |
| 29 | +1 | +1 | +1 | 0 | -2 | -3 | -3 |
| 30 | — | — | — | 0 | -2 | -3 | -4 |

| WINTER | THERMAL SENSATION | | | | | | |
|---|---|---|---|---|---|---|---|
| | -3 | -2 | -1 | 0 | +1 | +2 | +3 |
| ROOM TEMPERATURE(°C) 15 | +4 | +4 | +3 | 0 | — | — | — |
| 16 | +4 | +3 | +3 | 0 | -1 | -1 | -1 |
| 17 | +3 | +3 | +2 | 0 | -1 | -1 | -2 |
| 18 | +3 | +3 | +2 | 0 | -1 | -1 | -2 |
| 19 | +3 | +2 | +2 | 0 | -1 | -1 | -2 |
| 20 | +3 | +2 | +1 | 0 | -1 | -2 | -2 |
| 21 | +2 | +2 | +1 | 0 | -1 | -2 | -2 |
| 22 | +2 | +2 | +1 | 0 | -1 | -2 | -3 |
| 23 | +2 | +1 | +1 | 0 | -2 | -2 | -3 |
| 24 | +2 | +1 | +1 | 0 | -2 | -3 | -3 |
| 25 | +2 | +1 | +1 | 0 | -2 | -3 | -3 |
| 26 | +1 | +1 | +1 | 0 | -3 | -3 | -4 |
| 27 | — | — | — | 0 | -3 | -4 | -4 |

FIG. 4

PERSPIRATORY SENSATION IS 3

| SUMMER | | THERMAL SENSATION | | | | | | |
|---|---|---|---|---|---|---|---|---|
| | | -3 | -2 | -1 | 0 | +1 | +2 | +3 |
| ROOM TEMPERATURE (°C) | 22 | — | — | — | -1 | -1 | -1 | -1 |
| | 23 | — | — | — | -1 | -2 | -2 | -2 |
| | 24 | — | — | — | -1 | -2 | -2 | -2 |
| | 25 | — | — | — | -1 | -2 | -2 | -3 |
| | 26 | — | — | — | -1 | -2 | -2 | -3 |
| | 27 | — | — | — | -1 | -2 | -3 | -3 |
| | 28 | — | — | — | -1 | -3 | -3 | -4 |
| | 29 | — | — | — | -1 | -3 | -4 | -4 |
| | 30 | — | — | — | -1 | -3 | -4 | -5 |

FIG. 6

PERSPIRATORY SENSATION IS 2

| SUMMER | | THERMAL SENSATION | | | | | | |
|---|---|---|---|---|---|---|---|---|
| | | -3 | -2 | -1 | 0 | +1 | +2 | +3 |
| ROOM TEMPERATURE (°C) | 22 | — | — | — | -0.5 | -0.5 | -0.5 | -0.5 |
| | 23 | — | — | — | -0.5 | -1.5 | -1.5 | -1.5 |
| | 24 | — | — | — | -0.5 | -1.5 | -1.5 | -1.5 |
| | 25 | — | — | — | -0.5 | -1.5 | -1.5 | -2.5 |
| | 26 | — | — | — | -0.5 | -1.5 | -1.5 | -2.5 |
| | 27 | — | — | — | -0.5 | -1.5 | -2.5 | -2.5 |
| | 28 | — | — | — | -0.5 | -2.5 | -2.5 | -3.5 |
| | 29 | — | — | — | -0.5 | -2.5 | -3.5 | -3.5 |
| | 30 | — | — | — | -0.5 | -2.5 | -3.5 | -4.5 |

FIG. 7

PERSPIRATORY SENSATION IS 2

| WINTER | | THERMAL SENSATION | | | | | | |
|---|---|---|---|---|---|---|---|---|
| | | -3 | -2 | -1 | 0 | +1 | +2 | +3 |
| ROOM TEMPERATURE(°C) | 15 | — | — | — | -0.5 | -0.5 | -0.5 | -0.5 |
| | 16 | — | — | — | -0.5 | -1.5 | -1.5 | -1.5 |
| | 17 | — | — | — | -0.5 | -1.5 | -1.5 | -2.5 |
| | 18 | — | — | — | -0.5 | -1.5 | -1.5 | -2.5 |
| | 19 | — | — | — | -0.5 | -1.5 | -1.5 | -2.5 |
| | 20 | — | — | — | -0.5 | -1.5 | -2.5 | -2.5 |
| | 21 | — | — | — | -0.5 | -1.5 | -2.5 | -2.5 |
| | 22 | — | — | — | -0.5 | -1.5 | -2.5 | -3.5 |
| | 23 | — | — | — | -0.5 | -2.5 | -2.5 | -3.5 |
| | 24 | — | — | — | -0.5 | -2.5 | -3.5 | -3.5 |
| | 25 | — | — | — | -0.5 | -2.5 | -3.5 | -3.5 |
| | 26 | — | — | — | -0.5 | -3.5 | -3.5 | -4.5 |
| | 27 | — | — | — | -0.5 | -3.5 | -4.5 | -4.5 |

FIG. 8

ENVIRONMENTAL CONTROL SYSTEM AND METHOD

BACKGROUND OF THE INVENTION

The present invention relates to an environmental control system and to a method of environmental control and in particular to a control system which provides feed back control of temperature and humidity and a method of controlling temperature and humidity. The system and the method are each particularly useful for providing an individual with comfortable sleeping conditions.

In order to offer comfortable sleeping conditions, it is a common practice to warm a sleeper by means of an electric blanket, an electric under blanket, or a foot warmer. An alternate method of warming and cooling a bedroom is with the use of an air conditioner. However, this practice does not provide for temperature and humidity control on the surface of a mattress.

SUMMARY OF THE INVENTION

An environmental control system and method in which the room temperature is measured. A plurality of thermal sensors and a plurality of humidity sensors are fixed on a mattress which is placed on a bed. Air conditioning means control room temperature. The room temperature is controlled based on signals generated by room temperature measurement sensors, and by thermal sensors and humidity sensors fixed on the mattress.

The air conditioning means is controlled to produce air so as to keep the temperature in the vicinity of the bed different from that of the bedroom by an amount prescribed by several combined values. These combined values include a thermal sensation of a sleeper which is specified by measured temperature values by a plurality of thermal sensors, a perspiratory sensation of the sleeper which is specified by measured humidity values by humidity sensors, and the room temperatures. This results in a feedback control system which maintains comfortable conditions for the upper surface of the mattress.

BRIEF DESCRIPTION OF THE DRAWINGS

FIG. 4 is similar to FIG. 3 except that it is for winter use.

FIG. 6 illustrates an exemplary table which may be stored in the control circuit 7 of the second exemplary embodiment of the present invention, representing those differences between an desired temperature in the vicinity of the bed which is attained by the radiation panel and the room temperature, which are prescribed by the combined values of room temperature and the thermal and perspiratory sensations of the sleeper.

FIG. 7 illustrates an exemplary table which is similar to the table shown in FIG. 6 except that it is used for a perspiratory sensation value of 2 instead of 3.

FIG. 8 illustrates an exemplary table which is similar to the table shown in FIG. 7 except that it is used for winter use.

DETAILED DESCRIPTION OF THE INVENTION

Figure 1:
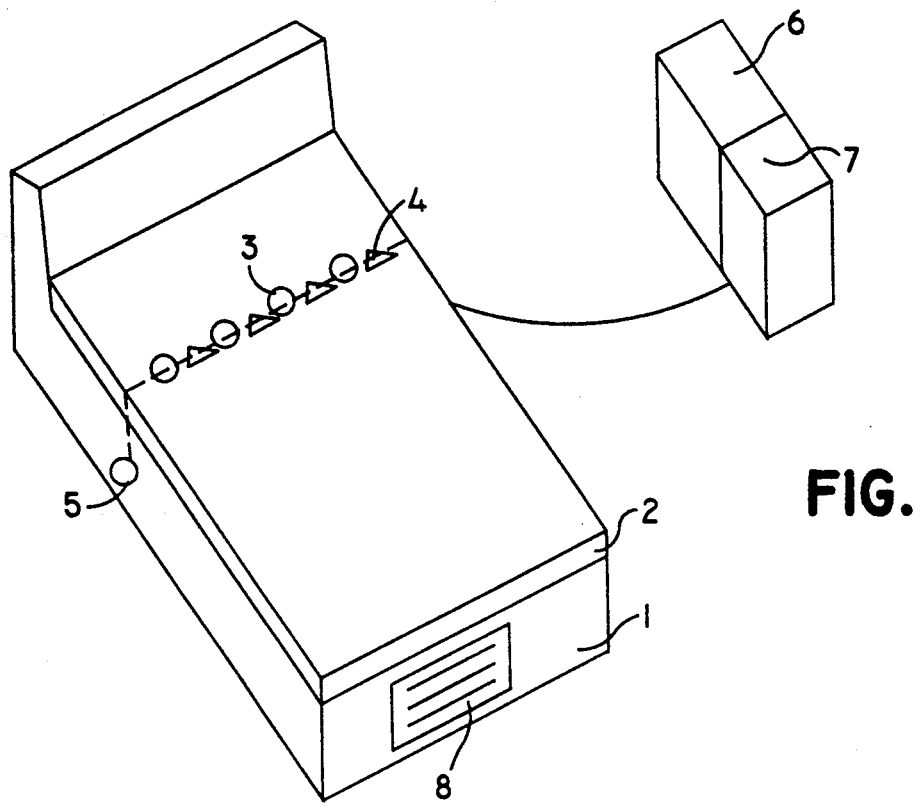
FIG. 1 shows an embodiment of the present invention comprising: a mattress 2 on the bed 1; a plurality of temperature sensors 3 and a plurality of humidity sensors 4 fixed on the mattress; an air conditioning unit 6 which controls temperature and humidity of the bedroom; and a control circuit 7. A method of the present invention may be practiced in accordance with the embodiment of the present invention shown in FIG. 1.

FIG. 1 illustrates a first exemplary embodiment of the present invention. A plurality of thermal sensors 3 and a plurality of humidity sensors 4 are fixed on a mattress 2 over a bed 1. A sleeper lies on the bed and is covered with some sort of covering (not shown).

Responsive to appropriate signals from a control circuit 7, an air conditioning unit 6 controls the temperature and the flow rate of the output air.

The control circuit 7, in response to the measured values of temperature and humidity which are received from the sensors on the bed, controls the output air from the air conditioning means 6, so as to vary the temperature and humidity of the air in the vicinity of the bed.

The air passes through the covering and the mattress from the vicinity of the bed to the bottom of the mattress, so as to maintain a comfortable environment in the vicinity of the mattress in terms of temperature and humidity. In short, by a feedback control, the control circuit 7 adjusts the temperature and humidity on the mattress so as to maintain comfortable conditions.

In order to obtain good results by the above mentioned feedback control, the temperature and humidity of the bedroom should be measured in the vicinity of the bed rather than at a location away from the bed.

For this reason, the temperature and humidity of the bedroom, as described in the detailed description and the claims of the present invention, should be interpreted as the temperature and humidity in the vicinity of the bed.

As shown in FIG. 1, the thermal sensors 3 and the humidity sensors 4 may be arranged on the mattress along a line crossing the back of the sleeper.

It has been experimentally confirmed that this arrangement of both sensors enables the measurement of the temperature and humidity of the sleeper with a minimal amount of error, and that there exists a good correlation between the temperature of the back of the sleeper and the thermal sensation and perspiratory sensation of the sleeper. This in turn results in a feeling of comfortableness for the sleeper.

When the sleeper lies on the bed, the temperature Tb and the humidity Hb on the mattress may also be expressed as the temperature and humidity of the sleeper, or the temperature and humidity of the back of the sleeper.

A thermal sensor attached to the side of the bed 1 measures the room temperature in the vicinity of the bed. An air blower 8 attached to the bed 1 directs into the bed the air in the vicinity of the bed upon receipt of appropriate signals from the control circuit 7 whenever the humidity on the mattress becomes very high.

In an exemplary embodiment of the present invention, thermistors were used as the thermal sensors 3. Furthermore, as the humidity sensors 4, ceramic substrates deposited with a thin-film semiconductor polymer which varies electric resistivity with humidity were used.

Of course, the materials set forth above are merely exemplary and other materials could be readily used by one skilled in the art.

Some of the thermal sensors 3 and humidity sensors 4 are in contact with or very close to the sleeper, while the others are away from the sleeper. Of course, the first group of sensors measures more exactly the temperature and humidity of the sleeper.

In the control system in accordance with an exemplary embodiment of the present invention, a thermal sensor which indicates the highest temperature may be in closest contact with the sleeper. The measured value of this thermal sensor reflects exactly the temperature of the sleeper Tb as well as the thermal sensation of the sleeper as described later.

For the same reason, a humidity sensor, among others, which is closest to a thermal sensor which indicates the highest temperature, gives an exact measured value of the humidity, reflecting the humidity of the sleeper Hb as well as the perspiratory sensation of the sleeper as described later.

Figure 2:
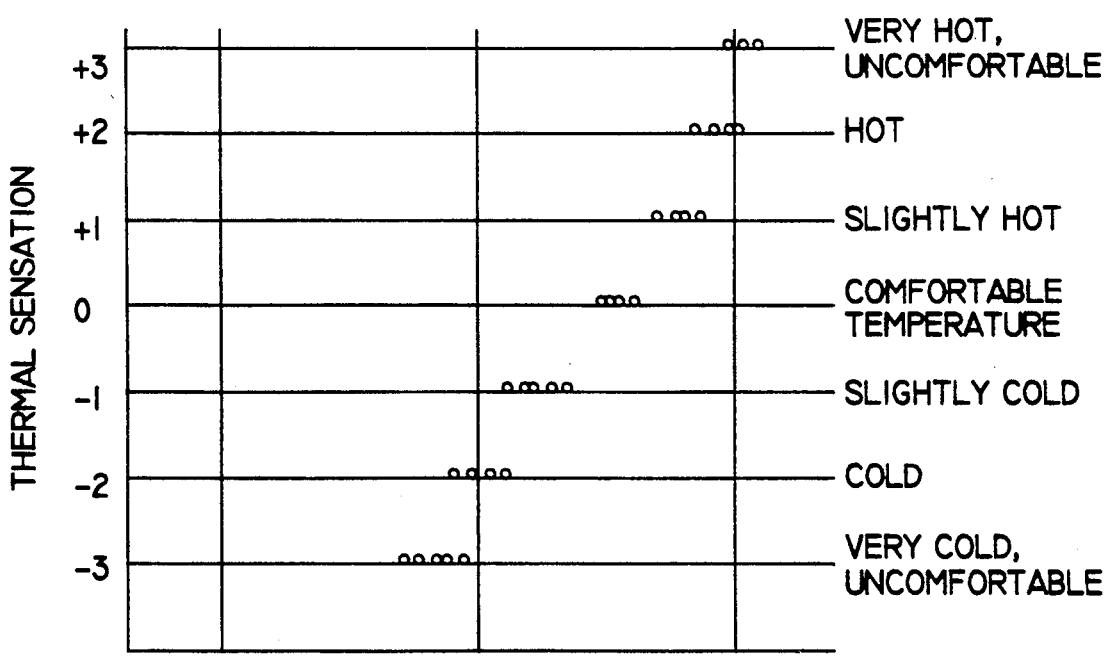
FIG. 2 illustrates the relationship between temperatures Tb on the mattress and thermal sensations of a sleeper.

FIG. 2 illustrates an experimentally obtained relationship between the temperature of the sleeper Tb and the thermal sensation of the sleeper.

In the control system in accordance with an exemplary embodiment of the present invention, the thermal sensation of the sleeper is divided into 7 classes from $-3$ to $+3$:

$-3$: very cold, uncomfortable
$-2$: cold
$-1$: slightly cold
0: comfortable temperature
$+1$: slightly hot
$+2$: hot
$+3$: very hot, uncomfortable The measurements of temperature and humidity are conducted once every 5 minutes, and measured values by the thermal sensors 3 and the humidity sensors 4, and the room temperature value by the thermal sensor 5 are input into the control circuit 7. The control circuit 7 chooses Tb from the measured values by a plurality of the thermal sensors 3, thereby specifying the class of the thermal sensation of the sleeper, and then controls the air conditioning means 6 to send that air to the vicinity of the bed whose temperature is different from the room temperature by an amount specified in the tables, as previously stored, shown in FIG. 3 or FIG. 4.

To discriminate between the room temperature and the temperature of the air blown from the air conditioning unit 6, measurement of the room temperature at 5 minute intervals is conducted while the air which is blown from the air conditioning unit 6 is temporarily stopped, or the temperature of the air blown from the air conditioning unit 6 is measured by a thermal sensor provided at a separate place while the thermal sensor 5 which measures the room temperature is kept from being exposed to the air blown from the air conditioning unit 6.

Setting of the temperature of the air blown from the air conditioning unit 6 is as follows:

In the summer, the room temperature is 28° C., and the thermal sensation is $+3$. In accordance with FIG. 3, a value of $-3$ is used. In other words, the air conditioning unit 6 is run over the next 5 minutes to blow air whose temperature is 3° C. below the room temperature, that is, 25° C. In other words, the control circuit 7 controls the air conditioning unit 6 to supply the vicinity of the bed with air which differs from the room temperature by $-3°$ C.

If the next measurement gives a room temperature of 27° C. and a thermal sensation of $+1$, the air conditioning unit 6 is again run over the next 5 minutes to send air whose temperature is 26° C., that is, 1° C. below the room temperature.

Setting of a temperature of the air blown from the air conditioning unit 6 for winter time use is prescribed by FIG. 4.

The desired temperature differences between the air blown from the air conditioning unit 6 and the room, given by the combined values of the room temperature and the thermal sensation, are specified as appropriate values which average people would accept. These values are stored in advance in the control circuit 7.

However, the values which are stored in the control circuit 7 may be modified to meet the taste of the sleeper, or the values may be determined by past use of the control circuit 7 so as to correlate with conditions of the bedroom or to match the taste of the sleeper.

The applicants have found that there exists a relationship between the humidity of the sleeper Hb and the perspiratory sensation of the sleeper, which is divided into 4 classes as follows:

0: $Hb < 65\%RH$
Perspiratory sensation not exists, comfortable
1: $65\% <= Hb <= 75\%RH$
Perspiratory sensation exists slightly
2: $75\%RH < = Hb < = 85\%RH$
Perspiratory sensation exists considerably
3: $85\%RH < = Hb$
Perspiratory sensation exists strongly, uncomfortable In order to lessen the perspiratory sensation, the flow rate of the air blown from the air conditioning unit 6 is varied by the control circuit 7 in response to the perspiratory sensation. This control is conducted by a forward looking control.

That is, the control circuit 7 controls the flow rate of the air blown from the air conditioning unit 6 such that, if the variation rate of Hb predicts that the perspiratory sensation after 5 minutes elapse is class 0, then the flow rate is set to be 0 or extremely low; if a predicted perspiratory sensation is class 1, then the flow rate is set to be low; if class 2, then middle; and if class 3, then high.

In this way, based on a predicted perspiratory sensation after 5 minutes' elapse, instead of a current perspiratory sensation at every 5 minutes' measurement, the forward looking control offering comfortableness and energy savings can be realized, thus preventing a sleeper from perspiration, so that sleeping is not hindered by perspiration.

The control circuit 7 also works such that it predicts in advance the termination of perspiration, and then reduces the air flow rate from the air conditioning unit 6, thus preventing a sleeper from catching a cold while sleeping as a result of cooling down of perspiration.

Whenever the humidity on the mattress is very high, the air blower 8 attached to the side of the bed 1 directs the air in the vicinity of the bed into the inside of the bed so as to reduce the humidity.

The bed 1 is provided with a duct which disperses the air overall onto the bottom of the mattress, and then lets the air pass through the mattress, thereby reducing the humidity on the mattress.

Figures 3, 5:
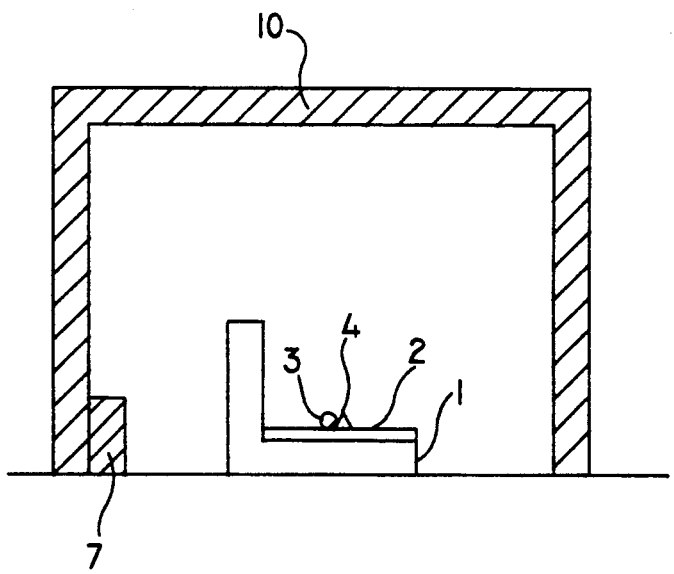
FIG. 3 illustrates an exemplary table which is stored in the control circuit of a first exemplary embodiment of the present invention, representing differences between a desired temperature in the vicinity of the bed which is attained by the air conditioning unit and a temperature of the room in the summer. The differences are prescribed by the combination of room temperature and thermal sensation of the sleeper.
FIG. 5 illustrates a second exemplary embodiment of the present invention, wherein a radiation panel 10 is employed as an air conditioning unit so as to vary the temperature in the vicinity of the bed 1.

FIG. 5 shows the second exemplary embodiment of the present invention, in which a radiation panel 10 is provided on the wall and the ceiling. The control circuit 7 controls the temperature of a fluid flowing inside the radiation panel 10, and varies the output from the radiation panel 10, thereby controlling the temperature of the room. The control of the room temperature by radiation provides a more comfortable condition and is very appropriate especially to control the temperature during sleep. This is because there is no temperature variation and no noise caused by the air flow.

The control circuit 7 selects the temperature of a sleeper Tb and the humidity of the sleeper Hb among the several values measured by a plurality of thermal sensors 3 and a plurality of humidity sensors 4; determines the classes of thermal and perspiratory sensations based thereon; and then controls the temperature of the fluid flowing inside the radiation panel 10 so as to supply that air to the vicinity of the bed whose temperature is different from the room temperature by an amount prescribed by FIG. 6, FIG. 7 and FIG. 8, which have been stored before.

When both the air flow, as described in the first exemplary embodiment, and the radiation panel are chosen, it is desirable that the air flow is run first and then followed by the radiation panel.

Namely, the control circuit 7, detecting that a sleeper goes to bed by means of a rapid temperature increase inside the bed, promptly offers a comfortable condition on the mattress by the air flow, and, subsequently, detecting that the sleeper falls into sleep judging from the temperature variation of the sleeper, switches from the temperature control by the air flow to that by the radiation panel which does not make noise.

Figure 9:
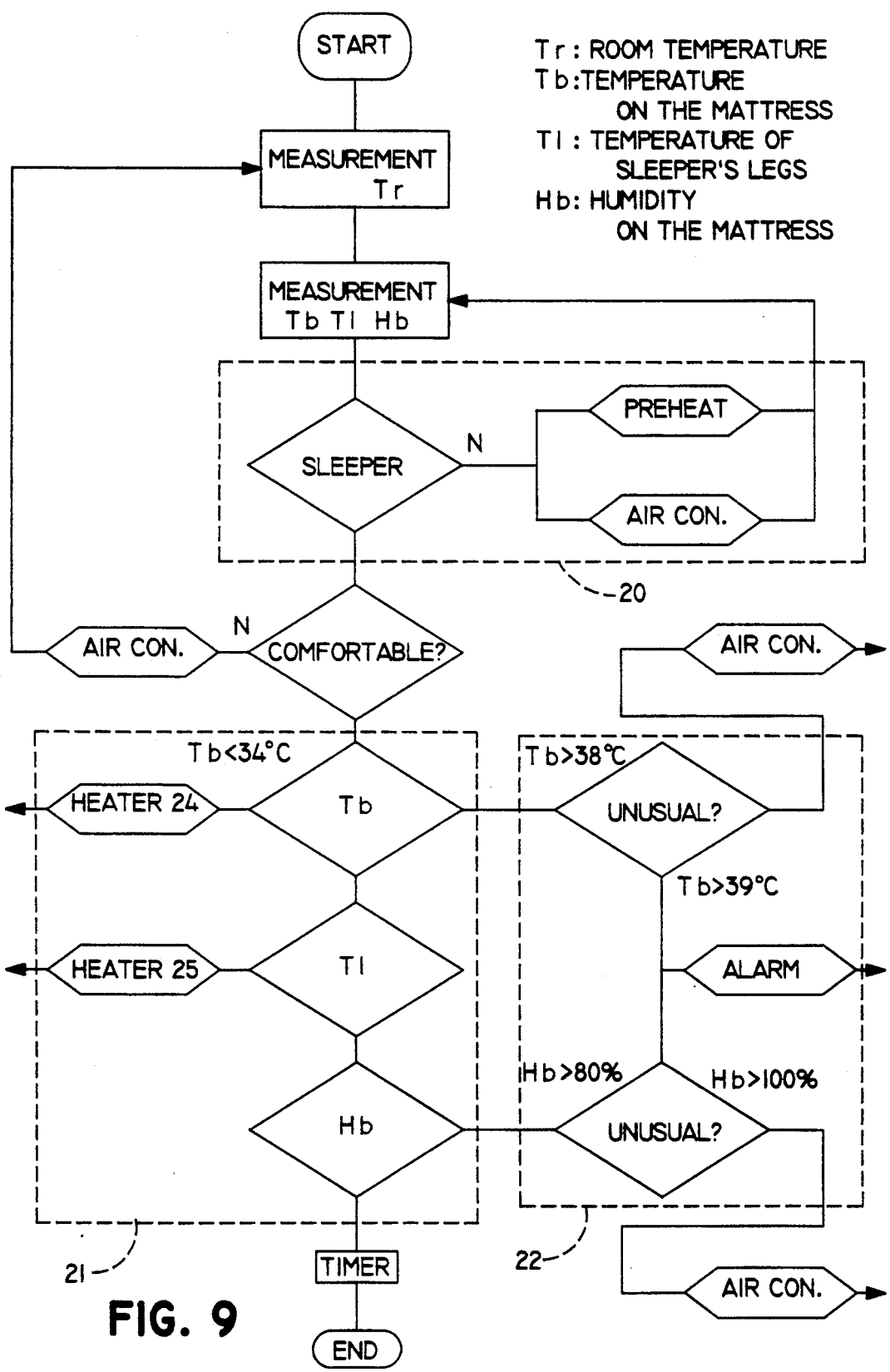
FIG. 9 illustrates a flow chart explaining the function of the control system in the bedroom in accordance with an exemplary embodiment of the present invention and some auxiliary functions thereof.

FIG. 9 shows a flow chart describing operation of an exemplary embodiment of the present invention, in which steps 20, 21 and 22 represent auxiliary functions which enhance the usefulness of the system.

By means of an auxiliary function 20, it is determined whether a sleeper is in bed or not, and whenever the sleeper is found to not be in bed, the air conditioning unit is signalled based on a prescribed mode so as to offer a comfortable condition on the mattress in advance before the sleeper goes to bed.

Figure 10:
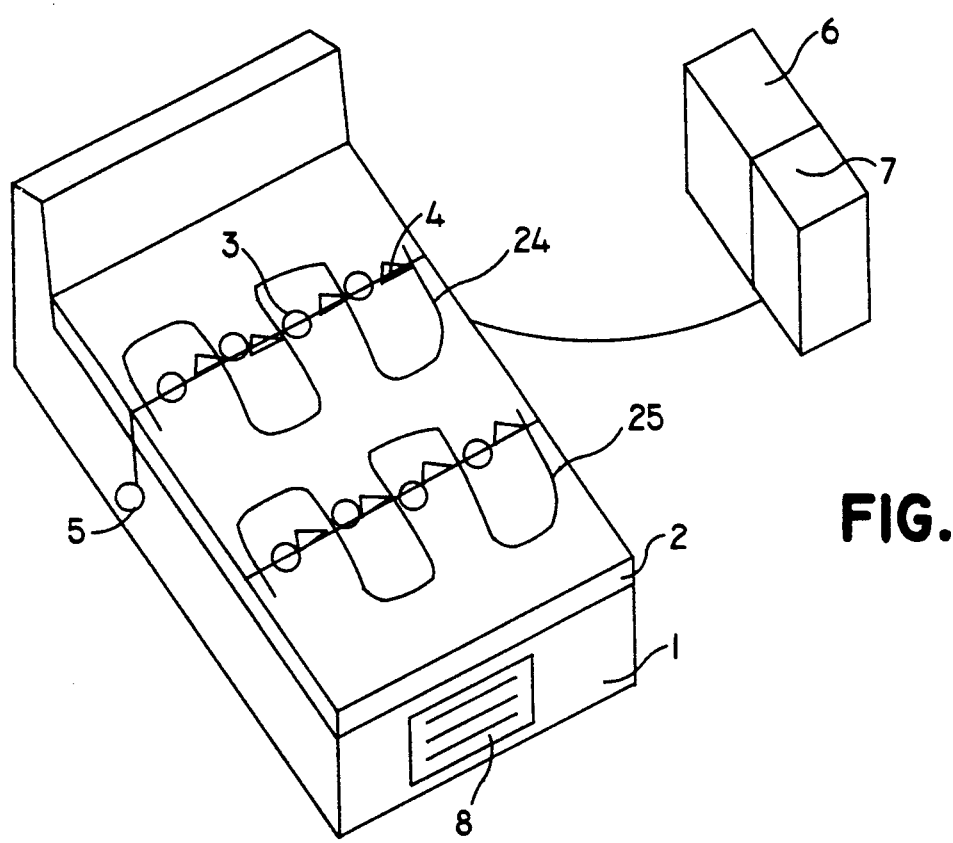
FIG. 10 illustrates a third exemplary embodiment of the present invention, in which measurements and the feedback control of temperature and humidity are performed behind the back of the sleeper and his legs, so as to provide the sleeper with comfortable sleeping conditions.

Another auxiliary function 21 provides, as shown in FIG. 10, a heater 24 which warms around the back of the sleeper, a heater 25 which warms around the legs of the sleeper, sensors which measure the temperature and humidity of the back of the sleeper, and sensors which measure the temperature and humidity of the legs of the sleeper.

The control circuit 7 controls the heaters 24 and 25 and the air conditioning unit 6 so as to offer comfortable conditions to the back and legs of the sleeper.

Still another auxiliary function 22 detects unusualness of the sleeper. When the thermal and humidity sensors indicate unusual values, for example, if the temperature on the mattress Tb exceeds 38° C., the air conditioning unit is signalled to run so as to decrease the room temperature, and furthermore, if Tb continues to be beyond 39° C. for more than a specified time, possibly meaning that the sleeper has a fever, an appropriate warning is activated.

If the humidity on the mattress Hb exceeds 80%, then the air conditioning unit is run so as to decrease the humidity, and furthermore, if Hb exceeds 100%, which may mean that bed-wetting has occurred, then an appropriate warning is activated.

What is claimed:

1. An environmental control system, for use with a bed comprising:
    means for measuring room temperature;
    a plurality of thermal sensors fixed on the bed,
    air conditioning means for varying room temperature; and
    control means for controlling the air conditioning means to supply air to a vicinity of the bed whose temperature is different from room temperature by an amount which is prescribed by a combination of a room temperature value and a thermal sensation value which is obtained from at least one measured value from the plurality of thermal sensors.

2. An environmental control system as set forth in claim 1, wherein the control circuit includes means for determining whether a sleeper is in the bed based on values obtained by the plurality of thermal sensors.

3. An environmental control system as set forth in claim 1, wherein a plurality of thermal sensors are fixed on the bed along a line crossing a back of a sleeper.

4. An environmental control system as set forth in claim 1, wherein the control circuit includes means for determining a thermal sensation of a sleeper from a highest value among measured values by the thermal sensors.

5. An environmental control system as set forth in claim 1, further comprising a plurality of thermal sensors fixed on the bed along a line crossing a back of a sleeper, and a plurality of thermal sensors fixed on the bed along a line crossing the legs of the sleeper.

6. An environmental control system as set forth in claim 5, further including heating means for separately warming around the back of a sleeper and around legs of the sleeper.

7. An environmental control for use with a bed comprising:
    means for measuring room temperature;
    a plurality of thermal sensors fixed on the bed,
    a plurality of humidity sensors fixed on the bed;
    air conditioning means for varying room temperature; and
    control means for controlling the air conditioning means to supply air to a vicinity of the bed whose temperature is different from room temperature by an amount which is prescribed by a combination of a room temperature value, a thermal sensation value which is determined from measured values by the thermal sensors, and a perspiratory sensation value of a sleeper which is determined from the measured values by the humidity sensors.

8. An environmental control system as set forth in claim 7, wherein a plurality of thermal sensors and a plurality of humidity sensors are fixed on the bed along a line crossing a back of a sleeper.

9. An environmental control system as set forth in claim 7, wherein the control circuit includes means for determining a thermal sensation of a sleeper from a highest value among the temperature values measured by the thermal sensors and then deciding a perspiratory sensation of the sleeper from a value which is indicated by a humidity sensor which is closest to the thermal sensor which indicates the highest temperature.

10. An environmental control system as set forth in claim 7, wherein the control circuit is provided with means for determining state of a sleeper, based on the measured values given by the thermal and humidity sensors.

11. An environmental control system comprising:
means for measuring room temperature;
a bed provided with a blower which takes into the bed air in a vicinity of the bed;
a plurality of thermal sensors fixed on the bed,
air conditioning means for varying room temperature; and
control means for controlling the air conditioning means to supply that air to a vicinity of the bed whose temperature is different from the room temperature by an amount which is prescribed by the combination of a room temperature value and a thermal sensation value which is decided from the measured value by the said thermal sensors.

12. An environmental control system comprising:
means for measuring the room temperature;
a bed provided with a blower which takes into the bed air in a vicinity of the bed;
a plurality of thermal sensors fixed on the mattress over the bed;
a plurality of humidity sensors fixed on the mattress over the bed;
air conditioning means for varying the room temperature; and
control means for controlling the air conditioning means to supply that air to the vicinity of the bed whose temperature is different from the room temperature by an amount which is prescribed by the combination of a room temperature value, a thermal sensation value of a sleeper which is decided from the measured value by the said thermal sensors, and a perspiratory sensation of the sleeper which is decided from the measured values by the humidity sensors.

* * * * *

UNITED STATES PATENT AND TRADEMARK OFFICE
CERTIFICATE OF CORRECTION

PATENT NO. : 5,299,428
DATED : April 5, 1994
INVENTOR(S) : Kawaguri et al.

It is certified that error appears in the above-indentified patent and that said Letters Patent is hereby corrected as shown below:

Cover page, item 75, Inventors: should read as follows:

Mariko Kawaguri, Osaka, Japan; Nobuyuki Yoshiike, Nara, Japan; Koji Arita, Osaka, Japan; Susumu Kobayashi, Osaka, Japan; Katsuya Morinaka, Osaka, Japan.

Cover Page, item 73, Assignee: should read: Matsushita Electric Industrial Co., Ltd., Osaka, Japan Signed and Sealed this Eighteenth Day of October, 1994

Attest:

BRUCE LEHMAN

*Attesting Officer*  *Commissioner of Patents and Trademarks*